May 21, 1935.  J. H. INGMANSON ET AL  2,002,204
PROCESS OF TREATING GUTTA PERCHA
Filed Sept. 29, 1933
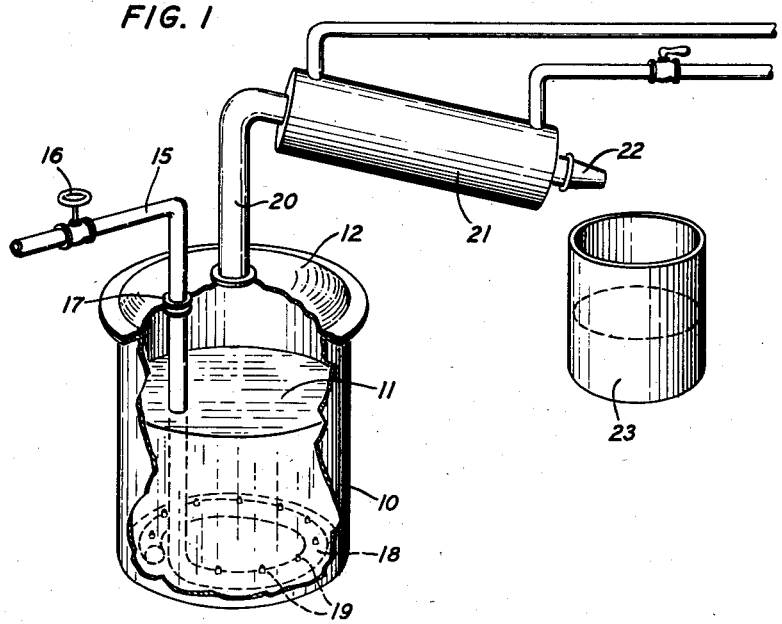
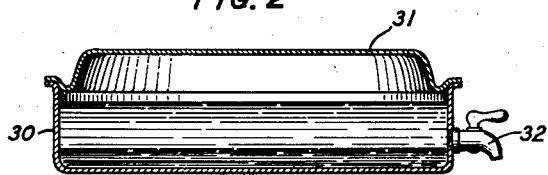
INVENTORS: J.H. INGMANSON
G.S. MUELLER
BY
ATTORNEY Patented May 21, 1935

2,002,204

UNITED STATES PATENT OFFICE 2,002,204

PROCESS OF TREATING GUTTA PERCHA

John H. Ingmanson, Rahway, N. J., and George S. Mueller, Richmond Hill, N. Y., assignors to Bell Telephone Laboratories, Incorporated, New York, N. Y., a corporation of New York Application September 29, 1933, Serial No. 691,510

4 Claims. (Cl. 18—49)

This invention relates to processes of treating gutta percha and particularly to processes for deriving separately the solid and liquid resin constituents of gutta percha.

The solid resin constituent of gutta percha has been termed "albane" and is a white crystalline substance; the liquid resin constituent has been termed "fluavil" and is in the form of a yellowish heavy liquid.

A field of application of the method is in the manufacture of submarine communication cables. The heavy insulation surrounding the conductors of such cables usually contains a large percentage of gutta percha, which consequently to a large degree determines the operating characteristics of the cables. Since these characteristics practically determine the commercial feasibility of a given cable project, expensive experimental investigations have been carried on for years to improve the characteristics of the insulating material. Whereas the electrical properties affect the problem of economic operation, the mechanical properties of the gutta percha are of extreme importance in the manufacturing operations in producing the cable and also affect the life of the cable.

As has been disclosed in the copending application Serial No. 425,710, filed on February 3, 1930, by A. R. Kemp and J. H. Ingmanson, and issued as Patent No. 1,935,321 on November 14, 1933, the characteristics of gutta percha in a large measure depend on the proportion in the composition of its resinous content, and in accordance with the disclosure in that application, it may be generally stated that the albane phase has eminently desirable electrical and mechanical properties, whereas the electrical properties of the fluavil phase may be quite detrimental to the success of the final product; the mechanical properties of fluavil may be of some advantage in the manufacture of a cable. The degree of desirability of the two phases may vary considerably and it should be understood that their properties may not finally be found to be inherent to the two main constituents, but that they perhaps may reside exclusively in minor quantities of closely associated native substances.

For these reasons it becomes important to devise ways of controlling the proportions or the presence and absence of the resin constituents in gutta percha intended for incorporation into the insulating compound.

For the purposes of the present specification and the claims, the term gutta percha should be understood to include the various types of gutta percha, and therefore also to include balata; the terms albane and fluavil or solid, crystalline and liquid constituents are intended to specify the two main constituents of the gutta percha resins and to include in each case such minor quantities of closely associated, naturally present substances which may be found to possess the desirable or undesirable properties of the constituents.

It is well known that resins are soluble and that the gutta-hydrocarbon base of gutta percha is not soluble in petroleum naphtha or gasoline at ordinary temperatures. It is known that the albane is soluble in hot alcohol and not in cold alcohol, and that fluavil is generally soluble in alcohol. These facts form the basis of methods of separating any one of the three constituents from the two others as disclosed in the copending application referred to above.

It is evident, however, that simpler and fuller control of the proportions of the three phases in the final product may be exercised when they are separately available for mixing in any desired proportions in accordance with the mechanical and electrical requirements for the insulating compound.

It is, therefore, a principal object of the invention to provide a method of treatment of gutta percha whereby the solid crystalline albane phase and the heavy liquid fluavil phase are made separately available for mixing in any desired proportions with the plastic hydrocarbon phase of the gutta percha, or, of course, with any other gutta compound natural, synthetic, treated or admixed.

Another object of the invention is to provide a simple method of treating the resinous constituent of gutta percha so that the albane and fluavil phases may be readily separated.

It is a further object to provide steps in a method of manufacturing gutta percha cable insulation whereby the solvent for extracting the resins from the gutta percha may be recovered and the major resin phases separated.

The invention is based upon the discovery that under certain circumstances the solid albane phase will precipitate out from the liquid fluavil phase provided the total resins have not been subjected to temperatures substantially above the boiling point of water.

In accordance with one feature of the invention, the resins during the total process of separation from the base and segregation into component parts are subjected to temperatures not substantially exceeding the boiling point of water.

In accordance with another feature of the invention, a gasoline (petroleum ether) extraction is taken from gutta percha at about room temperature or lower, subjected to distillation at a temperature between about 40° and 100° C., and the resinous derivative then permitted to stand at about room temperature to allow the solid albanes to precipitate out.

The invention in a preferred form will now be described in detail and reference will be made to the attached drawing, in which:

Fig. 1 is a schematic representation of a distilling equipment of any conventional type suitable for the separation of the gasoline solvent from a resinous extract; and Fig. 2 is a schematic representation of a recrystallization pan of any conventional type suitable for keeping the distillation residue for recrystallization.

In carrying out the process of the invention, a batch of gutta percha or balata, which has been found to have properties not consistent with the requirements for its use in a cable insulation compound, is cut up into small lumps and placed in a container together with gasoline and maintained at about room temperature, the gasoline will dissolve the total resins without dissolving the gutta percha and may after a while be drained off with its dissolved resins; by adding more gasoline and again draining and repeating this leaching process, the resins may be removed from the gutta-hydrocarbon to almost any desired degree.

In the recovery of the gasoline solvent from its resinous content different methods may be pursued. When distillation is resorted to, different temperatures may, of course, be chosen. However, we have discovered that temperatures substantially higher than 100° C. during this distillation process are inimical to the further process of the invention, namely, the subsequent separation of the albanes from the fluavil by recrystallization. Thus, in accordance with the preferred method, the distillation of the gasoline from the extract is done at temperatures close to 100° C. and may be done by heating the extract by means of steam, thus insuring against the temperature becoming excessive. It is perhaps the better method to blow steam directly into the extract rather than to heat the extract by passing steam through a submerged heating coil, unless very careful precautions are taken in the latter case against superheating of the steam and subjecting the extract to excessive temperatures. Thus, in accordance with a preferred method of the invention, an equipment such as shown diagrammatically in Fig. 1 may be used for distilling the gasoline from the extract, the arrangement being for blowing steam into the extract.

In accordance with Fig. 1, the container 10 holds a quantity 11 of the resin-gasoline solution and has a hermetically closed cover 12. A steam pipe 15 including the valve 16 leads through a gland 17 in the cover and connects to a circular steam distributor 18 near the bottom of the vessel 10, the distributor 18 may be ring formed and have outlets or jets 19 for injecting steam into the extract 11 to keep the temperature of the content about 100° C. An outlet pipe 20 for escape of evaporated gasoline and steam leads from the top of the vessel in a downward direction through the interior of a condensator 21 of any conventional type and ends in a spout 22 above a vessel 23 for receiving the condensed liquids.

In the operation of the device, steam is admitted by opening the valve 16 to the distributor 18 and passes through the jets 19 into the extract, which consequently is kept at a temperature of 100° C. without danger of overheating. At this temperature the gasoline will be evaporated from the extract and escape with part of the steam through the cooling pipe 20, where both will condense during their passage inside the condensator 21, and drip into the vessel 23 where they will form depth levels which may be readily separated in any well known manner.

The resin content of the extract 11 remains liquid at this temperature and consequently is left as a residue in the vessel 10 after the process has been continued for some time to practically remove all the gasoline by evaporation. Some water will remain in the vessel which may be removed at this time by filtering or drying; the water separates out very quickly in the container 10.

The residue in the vessel 10 is next allowed to cool which, of course, may take place in the vessel 10; in accordance with a preferred arrangement, the residue is removed from the vessel 10 and deposed in a recrystallization pan of any conventional type, as shown schematically in Fig. 2. The pan 30 is preferably of comparatively low height and may or may not be closed by a cover 31 during the cooling of the content to room temperature.

We have found that after about a day, the resinous residue in the vessel 30 begins to separate into two layers, the bottom layer being the crystalline, solid albane and the top layer the heavy, liquid fluavil; the bottom layer will gradually grow and after any desired time, depending upon how completely it is desired to separate the albanes from the fluavils, the solid layer may be pushed away from the spigot 32 and the liquid fluavil drained off; a substantially complete separation of albanes from the fluavils may be obtained in this manner when sufficient time is allowed.

The albane crystals left in the bottom of the vessel 30 will, of course, have their surfaces covered with fluavil and the further cleaning of the albanes may be performed in any desired manner as by washing with cold alcohol or by centrifuging or both.

The manufacturer may now choose his proportions of albane for addition to the gutta-hydrocarbon base to attain the desired properties of the insulating compound and may similarly add any desired amount of fluavil, perhaps to give proper thermoplastic characteristics to the final product. It is also possible for him to use the albane or fluavil, derived from one batch of gutta percha, for addition to another batch of inferior quality to improve its properties.

It is evident that the invention is susceptible to many modifications of details and applications without a departure from its principal concept.

What is claimed is:

1. A process which comprises extracting the solid and liquid resin phases of gutta percha from the gutta percha by means of a solvent for the resin phases and then removing the solvent from the resin phases, characterized in this that the temperature of the resin phases is kept at or below 100° C. during the entire process.

2. A method of analysis of gutta percha comprising cold leaching of resins from the gutta-hydrocarbon by gasoline, steam distilling the gasoline from the resins, storing the resins undisturbed at about room temperature until a precipitate of the solid phase of the resin appears.

3. A process of treating gutta percha comprising cold leaching the resins from the gutta-hydrocarbon by petroleum naptha, heating the resinous naphtha solution to temperatures not substantially exceeding 100° C. to expel the naphtha, retaining the resulting resinous derivative at about room temperature until a desired amount of albane has precipitated out.

4. A process of deriving separately the crystalline, the liquid and the plastic bases of gutta percha which comprises breaking up a batch of gutta percha, adding gasoline and draining off the gasoline with the dissolved resins, alternating said latter two steps a number of times at temperatures not substantially higher than 15° C., distilling out the gasoline from the resins dissolved therein by heating the resinous solution to between about 40° C. and 100° C. preferably by blowing steam into the solution to recover the gasoline, deposing the resinous derivative a sufficient length of time for recrystallization of albanes in the derivative at a temperature not substantially in excess of 20° C., and separating the crystallization precipitate from the liquid, for example, by centrifuging.

JOHN H. INGMANSON.
GEORGE S. MUELLER.